(12) United States Patent
Li (10) Patent No.: US 8,978,099 B2
(45) Date of Patent: Mar. 10, 2015

(54) METHODS AND DEVICES FOR DETECTING AN IP ADDRESS

(75) Inventor: Wei Li, Beijing (CN)

(73) Assignee: Hangzhou H3C Technologies Co., Ltd., Zhejiang (CN)

( * ) Notice: Subject to any disclaimer, the term of this patent is extended or adjusted under 35 U.S.C. 154(b) by 0 days.

(21) Appl. No.: 13/997,079

(22) PCT Filed: Jan. 29, 2012

(86) PCT No.: PCT/CN2012/070740
§ 371 (c)(1),
(2), (4) Date: Jun. 21, 2013

(87) PCT Pub. No.: WO2012/100747
PCT Pub. Date: Aug. 2, 2012

(65) Prior Publication Data
US 2013/0298207 A1    Nov. 7, 2013

(30) Foreign Application Priority Data
Jan. 28, 2011    (CN) .......................... 2011 1 0031087

(51) Int. Cl.
*H04L 9/32*    (2006.01)
*H04L 29/06*    (2006.01)
(Continued)

(52) U.S. Cl.
CPC ................ *H04L 63/08* (2013.01); *H04L 45/02* (2013.01); *H04L 61/2514* (2013.01)
USPC ....................................... 726/2; 726/3; 726/4

(58) Field of Classification Search
CPC ....... H04L 63/08; H04L 63/101; H04L 63/10; H04L 63/029; H04L 45/02; H04L 61/2514; G06F 21/31

USPC .......... 726/2–6, 11–14, 27–29; 713/153–154; 709/224–225
See application file for complete search history.

(56) References Cited

U.S. PATENT DOCUMENTS 5,550,984 A * 8/1996 Gelb ............................ 709/245
6,006,258 A * 12/1999 Kalajan ........................ 709/219
(Continued)

FOREIGN PATENT DOCUMENTS

| CN | 1630256 | 6/2005 |
|---|---|---|
| CN | 101163264 | 4/2008 |

(Continued)

OTHER PUBLICATIONS

CN First Office Action dated Jul. 3, 2012 issued on CN Patent Application No. 201110031087.5 dated Jan. 28, 2011, The State Intellectual Property Office of the P.R. China.
(Continued)

*Primary Examiner* — Hosuk Song
(74) *Attorney, Agent, or Firm* — Mannava & Kang, P.C.

(57) ABSTRACT

A method for detecting an IP address. An access router releases the routes of a detected IP address via a first interface and a second interface, and sets the priority of the route released via said first interface lower than that of the route released via said second interface. After having received by said access router a WEB request by the user via said first interface, the method comprises searching a session record corresponding to said WEB request; establishing by said access router the session record corresponding to said WEB request when the corresponding session record is not found, and returning a redirecting message taking said detected IP address as the re-directed destination IP address; and after having received by said access router via said second interface the message taking said detected IP address as the destination IP address, determining that the user who sent said message is an illegal user.

10 Claims, 6 Drawing Sheets

(51) Int. Cl.
*H04L 12/751* (2013.01)
*H04L 29/12* (2006.01)

(56) References Cited

U.S. PATENT DOCUMENTS

| | | | | |
|---|---|---|---|---|
| 7,320,070 | B2 * | 1/2008 | Baum | 713/153 |
| 7,716,742 | B1 * | 5/2010 | Roesch et al. | 726/25 |
| 7,873,985 | B2 * | 1/2011 | Baum | 726/2 |
| 2003/0200455 | A1 | 10/2003 | Wu | |
| 2010/0318631 | A1 | 12/2010 | Shukla | |

FOREIGN PATENT DOCUMENTS

| | | |
|---|---|---|
| CN | 101212375 | 7/2008 |
| CN | 102118313 | 7/2011 |

OTHER PUBLICATIONS

International Search Report and Written Opinion dated May 3, 2012 issued on PCT Patent Application No. PCT/CN2012/070740 dated Jan. 29, 2012, The State Intellectual Property Office, the P.R. China.

* cited by examiner

METHODS AND DEVICES FOR DETECTING AN IP ADDRESS

CLAIM FOR PRIORITY

The present application is a national stage filing under 35 U.S.C 371 of PCT application number PCT/CN2012/070740, having an international filing date of Jan. 29, 2012, which claims priority to Chinese Patent Application No. 201110031087.5, filed on Jan. 28, 2011, the disclosures of which are hereby incorporated by reference in their entireties.

BACKGROUND

At present, domestic operators respectively establishes networks, which are all mutually independent from access network, metropolitan area network to backbone network. If a client of Operator A intends to access resources of servers of Operator B, he needs to pass through a uniform access channel between the network of the Operator A and the network of the Operator B. A switching center is included in the access channel. Any traffic from Operator A actively accessing Operator B and any traffic from Operator B actively accessing Operator A is counted at the switching center in the access channel. Thus any cross-network traffic is counted and can be billed accordingly. However, some unscrupulous users may try to avoid being billed for cross-network traffic.

DETAILED DESCRIPTION

Figure 1:
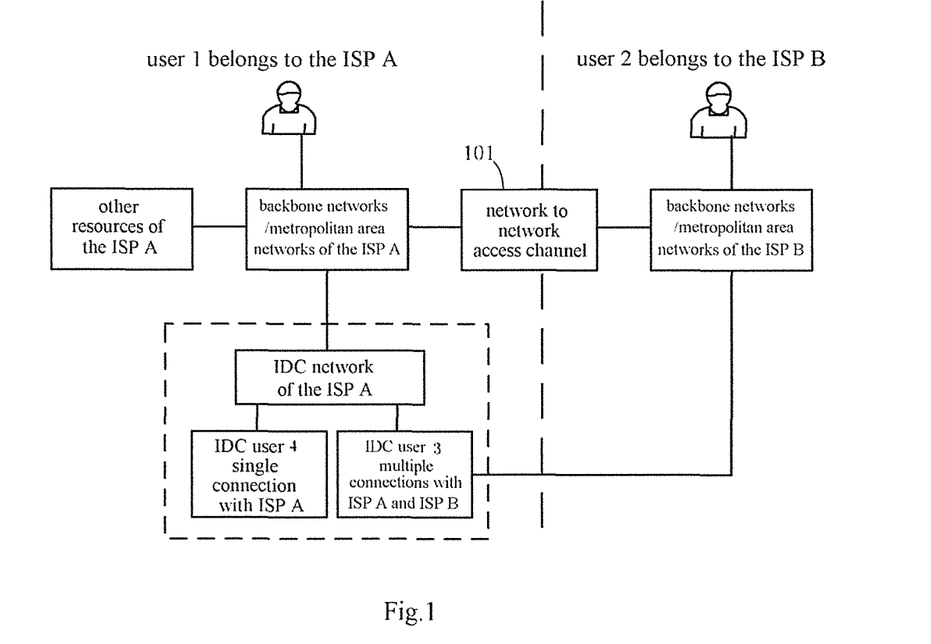
FIG. 1 is a schematic diagram of the networking way of traffic penetration according to an example.

Generally, after purchasing networks of Operator A and Operator B, some clients then resell the network of Operator A to other operators. The other operators only need to pay the cost to these clients and can evade paying Operator A. As shown in FIG. 1, user 2 is a legal user of Operator B. Meanwhile IDC (Internet Data Center) user 3 is both a user of ISP (Internet Service Provider) A and a user of ISP B. If the user 2 is to request resources of Operator A, there are two ways for the user 2 to get the requested resources: the first way is to access via a network to network access channel 101, and the second way is to access via the IDC user 3. If the user 2 requests resources of Operator A via the IDC user3, paying Operator A will be evaded. Using cross-network traffic in this way to avoid billing is called traffic penetration.

Figure 2:
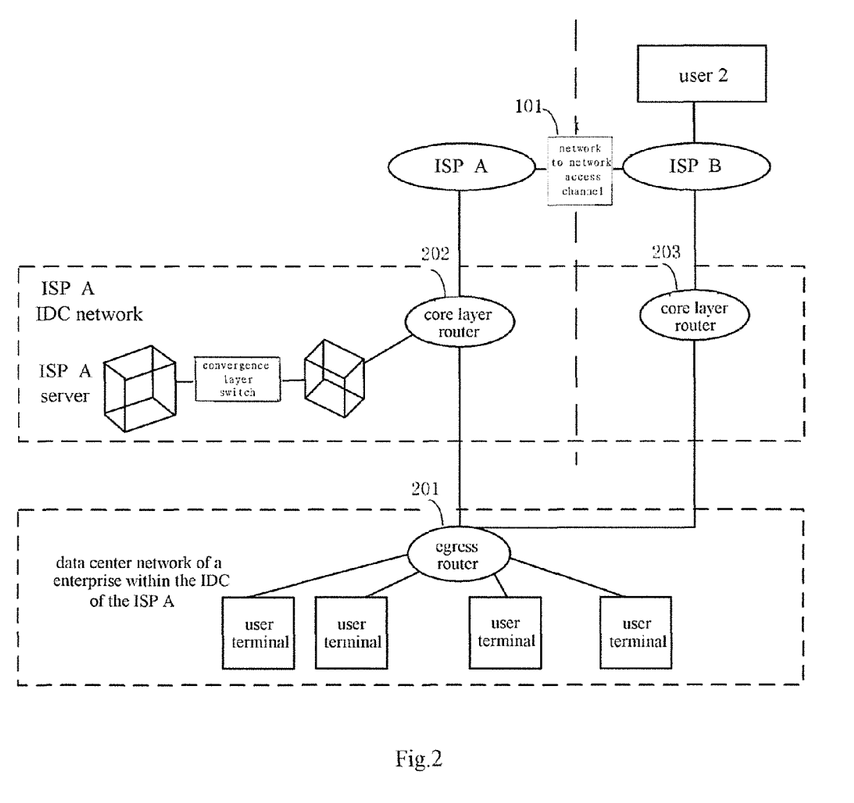
FIG. 2 is a schematic diagram of network where the ways of routing strategy and source address checking are employed for detecting traffic penetration according to an example.

In order to solve the problem of evading payment, routing strategy and source address checking may be employed to detect traffic penetration. As shown in FIG. 2, an egress router 201 in an Intranet learns the routes of ISP A and B from the core layer routers 202, 203 (which are also referred to as access router) of the IDC and releases the learned routes, such that the user 2 obtains the route of accessing ISP A via the egress router 201. Routing strategy and source address checking are initiated on a downstream interface (an interface that connects enterprise client) of the core layer router 201 of ISP A. The routing strategy requires that no routing information other than routing information of a specified range of addresses is received, and these specified addresses need to be preconfigured on the downstream interface of the core layer router 202. Since the address of the user 2 is not within the specified range of addresses, the user 2 is unable to access ISP A via the downstream interface of the core layer router 202. The solution of source address checking requires that the core layer router 202 of ISP A is to check the information of the source address of a message while receiving the message from the downstream interface, if the source address does not belong to the range of addresses allocated to users by ISP A, the message would be discarded directly.

The above described routing strategy and source address checking may prevent traffic penetration in some cases, however, if the egress router 201 of an Intranet enables NAT (Network Address Translation), traffic penetration cannot be detected by means of routing strategy and source address checking.

In accordance with an embodiment, an access router of an operator's network configures a detected IP address, and sets that the priority of the route of the detected IP address released via a first interface is lower than that of the route released via a second interface, wherein, the access router of the operator's network comprises but is not limited to an IDC network of the operator's network, the first interface connected to the network accessed by the user, and the second interface connected to an upstream access channel of the present operator's network. The network accessed by a user in particular may be an Intranet, or an office building network, an enterprise park network, etc. under the IDC network. The upstream access channel of the present operator's network is connected to a network to network access channel between the present operator's network and other operator's network via single-hop or multiple-hop.

Upon receiving via the first interface a message sent by a user for the first time, the access router sends a redirecting message to the user, requiring that the user resend a WEB request taking the detected IP address as the destination IP address, causing the illegal user to send a redirected WEB request via the network to network access channel, thus the illegal user's access to network may be controlled and information of the illegal user may be obtained.

Figure 3:
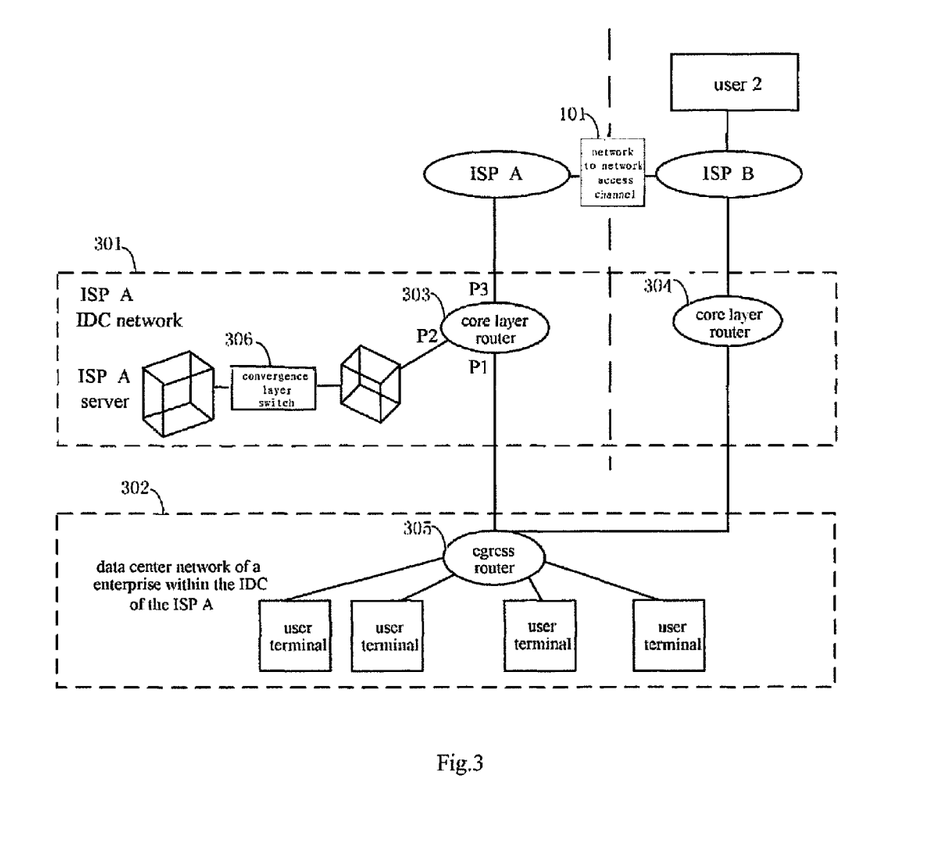
FIG. 3 is a schematic diagram of a system for detecting an IP address in accordance with an example.

As shown in FIG. 3, the system comprises an IDC network 301 of an ISP A, a data center network 302 of an enterprise within the IDC network 301 of the ISP A, a network of an ISP B, a core layer routers 303, 304 of the IDC network 301 (the access router of the user), an egress router 305 of the data center network 302 and a user 2.

Wherein, a detected IP address IP1 is configured on the core layer router 303, for example, on a Loopback interface of the core layer router 303. Port P1 of the core layer router 303 is connected to the data center network 302, port P2is connected to the convergence layer switch 306, and port P3 is connected to the network to network access channel 101. The core layer router 303 normally releases the routes of IP1 on P2 or P3, when the routes of IP1 are released on the port P1 connected to the data center network 302, the core layer router 303 processes the routing information, so that the priority of the released routes of IP 1 is lower than those of the routes of IP1 released via P2 or P3. The processing upon the routing information by the core layer router 303 comprises: increasing the path length of AS-Path or modifying the value of MED when releasing via EBGP (External Border Gateway Protocol); and increasing the path length of AS-Path or modifying the value of MED when releasing via IBGP (Internal Border Gateway Protocol).

In order to detect the message sent by the user for the first time, a WEB session record for P1 is further needed to be done by the core layer router 303. The content of WEB session record includes but is not limited to one or more types of information as follows: source and destination IP address, source and destination port number, incoming interface and time stamp information of received messages. When the core layer router 303 receives a message via P1, it is needed to check whether there is a matched WEB session record for the message, if there is a matched WEB session record, the message will be normally forwarded; if there is no matched WEB session record, a new WEB session record for the message is needed to be established. Preferably, a time stamp is needed to be added into the WEB session record, and the core layer router 303 may age the WEB session record according to the information of the time stamp thereof. In addition, the core layer router 303 further may check whether there is a WEB session record corresponding to the message when the message is sent, here the processing subsequent to the detection is the same as the procedure of processing subsequent to the detection of the session record of the received message.

If the result of the detection of the WEB session record of the received message by the core layer router 303 is that a new WEB session record is needed to be established, the core layer router 303 determines that the message is a message sent by the user 2 for the first time, the IP address thereof needs to be detected.

Figure 4:
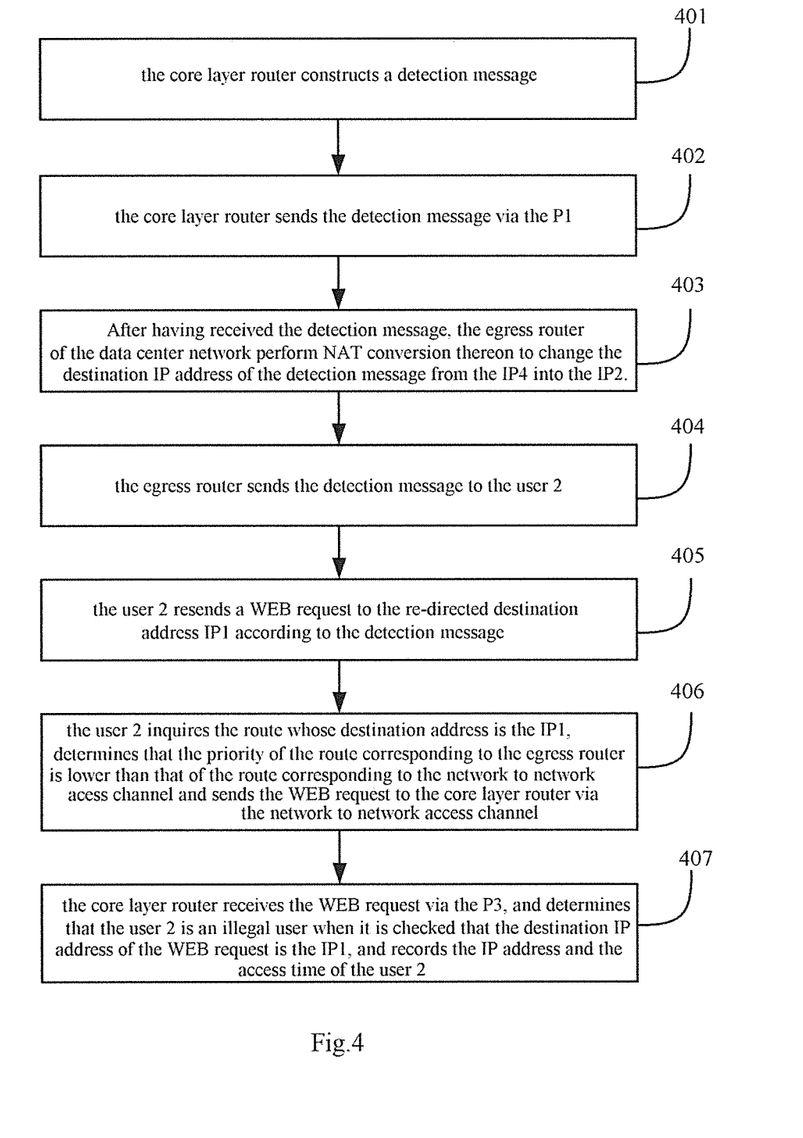
FIG. 4 is a schematic diagram of a process of detecting an IP address in accordance with one example.

Supposed that the source IP address of the WEB request sent by the user 2 for the first time via the egress router 305 is IP4, the IP address of the user 2 is IP2, the procedures of detecting the IP address are as shown in FIG. 4, comprising:

Block 401: the core layer router 303 constructs a detection message.

When the core layer router 303 detects that there is no session record that corresponds to the WEB request sent by the user 2, the core layer router 303 establishes a session record corresponding to said WEB request, and constructs a detection message. In one embodiment, the detection message may be a compulsory redirecting message, i.e. a redirecting message returned by simulating the WEB server. In other embodiments, the detection message may be other types of message. The destination IP address and port number of the detection message are the source IP address and port number of the WEB session record, the source IP address and port number of the detection message are the destination IP address and port number of the WEB session record. The re-directed destination address in the redirecting message is the detected IP address IP1.

Block 402, the core layer router 303 sends the detection message via the P1.

Block 403, after having received the detection message, the egress router 305 of the data center network 302 performs NAT conversion thereon to convert the destination IP address of the detection message from the IP4 into the IP2.

Block 404, the egress router 305 sends the detection message to the user 2.

Block 405, the user 2 resends a WEB request to the re-directed destination address IP1 according to the detection message.

Block 406, the user 2 inquires the route whose destination address is the IP1, determines that the priority of the route corresponding to the egress router 305 is lower than that of the route corresponding to the network to network access channel 101 and sends the WEB request to the core layer router 303 via the network to network access channel 101.

Block 407, the core layer router 303 receives the WEB request via the P3, determines that the user 2 is an illegal user when it is checked that the destination IP address of the WEB request is the IP1, and records the IP address and the access time of the user 2.

Specifically, the core layer router 303 further may determine whether the user 2 is an illegal user according to the incoming interface and other feature data of the WEB request, for example, the feature data such as URL and etc. may be recorded in the message, the core layer router 303 searches the corresponding WEB session record according to the feature data, the incoming interface of the message in the WEB session record is found to be P1 instead of P3 through comparison, the user 2 is determined as an illegal user. After the user 2 is determined as an illegal user, the core layer router 303 may terminate the user 2's access to the network, or continue permitting the user 2 to access the network. The IP address and access time of the user 2 is recorded by the core layer router 303 to facilitate tracking and determining illegal access. In addition, if the corresponding WEB session record is found by the core layer router 303 according to the feature data, the corresponding session record is deleted upon the determination that the user 2 is illegal.

Figure 5:
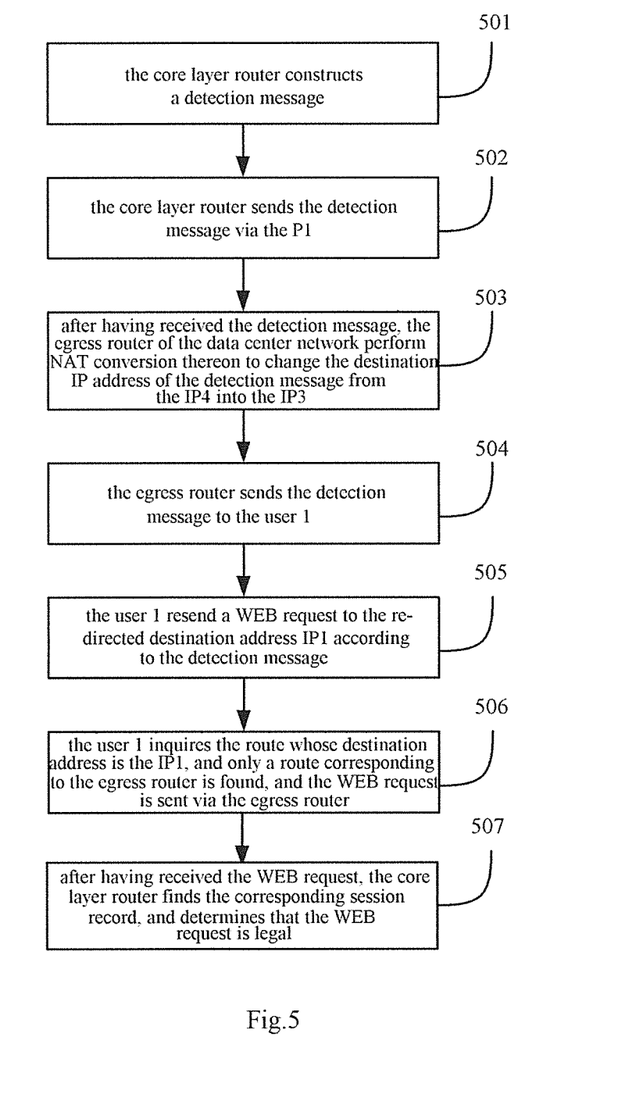
FIG. 5 is schematic diagram of a process of detecting an IP address in accordance with another example.

If the core layer router 303 determines that the message sent by a user for the first time is a message sent by a user 1 of ISP A, supposed that the source IP address of the WEB request sent by the user 1 for the first time via the egress router 305 is IP4, the IP address of the user 1 is IP3, the process of detecting an IP address is as shown in FIG. 5, comprising:

Block 501, the core layer router 303 constructs a detection message.

When the core layer router 303 detects that there is no session record that corresponds to the WEB request sent by the user 1, a session record corresponding to the WEB request is established by the core layer router 303, and a detection message is constructed. The destination IP address and port number of the detection message are the source IP address and port number of the WEB session record, the source IP address and port number of the detection message are the destination IP address and port number of the WEB session record. The re-directed destination address in the redirecting message is the detected IP address IP1.

Block 502, the core layer router 303 sends the detection message via the P1.

Block 503, after having received the detection message, the egress router 305 of the data center network 302 performs NAT conversion thereon to convert the destination IP address of the detection message from the IP4 into the IP3.

Block 504, the egress router 305 sends the detection message to the user 1.

Block 505, the user 1 resends a WEB request to the re-directed destination address IP1 according to the detection message.

Block 506, the user 1 inquires the route whose destination address is the IP1, only a route corresponding to the egress router 305 is found, and the WEB request is sent via the egress router 305.

Block 507, after having received the WEB request, the core layer router 304 finds the corresponding session record, and determines that the WEB request is legal.

In an embodiment, the access router of the IDC of the operator's network configures a detected IP address, the priority of the routes of the detected IP address released via a network to network access channel are higher, the access router sends a redirecting message taking the detected IP address as the re-directed destination IP address, whereby an illegal user has to send a redirecting message via the network to network access channel, thus traffic penetration of the illegal user may be found.

It is noted that methods according to embodiments not only are adapted to the access router of an IDC of an operator's network, but also are adapted to other network situations of traffic penetration. For example, the egress router of an office building network or an enterprise park network is simultaneously connected to Operator A and Operator B, as long as Operator A and Operator B permit the egress router to have the routes of the whole network imported thereto, a NAT gateway may be configured and traffic penetration may be realized, the solutions according to embodiments are also adapted to this situation, here the access router corresponding to the egress router also may solve the problem of traffic penetration by the above-mentioned methods.

Figure 6:
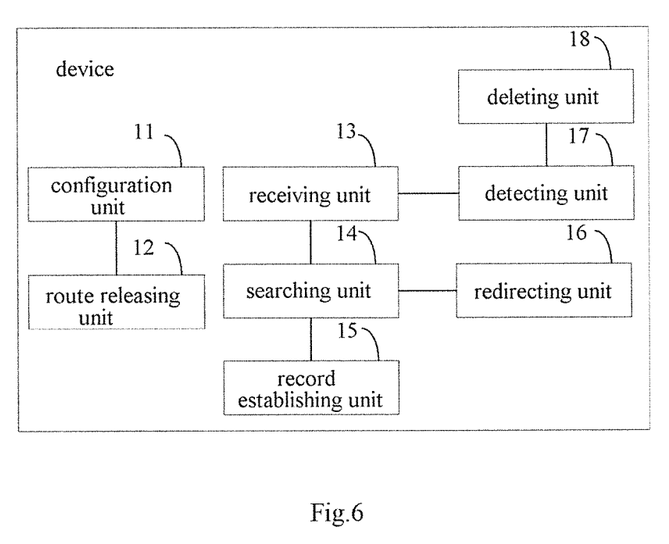
FIG. 6 is a structural schematic diagram of a device for detecting an IP address in accordance with still another example.

Based on the same technical concept as that of the aforesaid process blocks, a device for detecting an IP address is provided in the present disclosure, which device acts as an access router for use in an Internet data center IDC of an operator's network, said device is connected via a first interface to the data center network, and is connected via a second interface to a network to network access channel to other operator's network, as shown in FIG. 6, said device comprises:

a configuration unit 11 to configure a detected IP address;

a route releasing unit 12 to release routes of said detected IP address via said first interface and said second interface, and to set that the priority of the route released via said first interface is lower than that of the route released via said second interface;

a receiving unit 13 to receive messages sent by the user via said first interface and second interface;

a searching unit 14 to search a session record corresponding to a WEB request when said receiving unit receives via said first interface said WEB request sent by the user;

a record establishing unit 15 to establish a session record corresponding to said user when said searching unit fails to find a matched session record;

a redirecting unit 16 to return a redirecting message which takes said detected IP address as a re-directed destination IP address when said searching unit fails to find the corresponding session record; and a detecting unit 17 to detect whether the destination IP address of the message received by said receiving unit via said second interface is said detected IP address, and determining that the user who sent said message is an illegal user when the detection result is yes.

said configuration unit 11 is further to configure said detected IP address on a Loopback interface.

said route releasing unit 12 is further to increase the path length of AS-Path or modifying the value of MED when the route is released via said first interface.

said redirecting message further carries a feature identification of the session record corresponding to said WEB request, and the device further comprises:

a deleting unit 18 to search the corresponding session record according to the feature identification of the session record carried by said redirecting message when said detecting unit determines that the user who sent said message is an illegal user, and to delete the same.

said detecting unit 17 is further to: determine that the user who sent said message is a legal user when the corresponding session record is found by said searching unit or when said receiving unit receives via said first interface a message who takes said detected IP address as the destination IP address.

As described in more detail below, each of the above mentioned units in FIG. 6 may be implemented as machine readable instructions executable by one or processors of the device. Alternatively, some or all of the units may be implemented as one or more hardware modules comprising logic circuitry to perform the above described operations.

In one embodiment, the access router of the IDC of the operator's network configures a detected IP address, the priority of the route of the detected IP address released via an network to network access channel is higher, the access router sends a redirecting message taking the detected IP address as the re-directed destination IP address, whereby an illegal user has to send a redirecting message via the network to network access channel, thus traffics penetration of the illegal user may be found.

The examples and embodiments described above may be implemented by hardware, software or firmware or a combination thereof. For example the various methods, processes and functional units described herein may be implemented by a processor (the term processor is to be interpreted broadly to include a CPU, processing unit, ASIC, logic unit, or programmable gate array etc.) The processes, methods and functional units may all be performed by a single processor or split between several processers. In a common implementation the units may be implemented as machine readable instructions executable by one or more processors. Further the teachings herein may be implemented in the form of a software product. The computer software product is stored in a storage medium and comprises a plurality of instructions for making a computer device (which can be a personal computer, a server or a network device, etc.) implement the method recited in the examples of the present disclosure.

Those skilled in the art can understand that the modules or units in the device in the examples can be arranged in the device as described in the embodiment, or can be alternatively located in one or more devices different from that in the example. The modules in the aforesaid example can be combined into one module or further divided into a plurality of sub-modules.

Accompanying figures are only schematic diagrams of examples, the modules, units or process block in the figures are not indispensable.

Those skilled in the art may understand that the modules in the device in embodiment may be adaptively varied and disposed in one or more devices different from the embodiment. The modules or units in the embodiment may be combined into one module or unit, and further may be divided into multiple sub-modules or sub-units.

All of features disclosed in this specification (including any accompanying claims, abstract and drawings), and/or all of the processes or units of any method or device so disclosed, may be combine in any combination, except combinations where at least some of such features and/or processes or units are mutually exclusive. Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed in one example only of a generic series of equivalent or similar features.

The invention claimed is:

1. A method for detecting an IP address, for application in an access router in an operator's network, with said access router being connected via a first interface to a network accessed by a user and being connected via a second interface to an upstream access channel of the operator's network, wherein, said access router configures the detected IP address and the method comprises:
  releasing by said access router routes of said detected IP address via said first interface and said second interface, and setting that a priority of the route released via said first interface is lower than that of a route released via said second interface;
  after having received by said access router a WEB request by the user via said first interface, searching a session record corresponding to said WEB request;
  establishing by said access router the session record corresponding to said WEB request when the corresponding session record is not found, and returning a redirecting message taking said detected IP address as a re-directed destination IP address; and
  after having received by said access router via said second interface another message having the re-directed destination IP address, determining that the user who sent said another message is an illegal user.

2. The method as claimed in claim 1, wherein said access router configuring the detected IP address comprises: configuring by said access router said detected IP address on a loopback interface.

3. The method as claimed in claim 1, wherein said setting that the priority of the route released via said first interface is lower than that of the route released via said second interface comprises:
  increasing the path length of an autonomous system path (AS-Path) or modifying the value of a multi-exit discriminator (MED) when the route via said first interface is released.

4. The method as claimed in claim 1, wherein said redirecting message further carries a feature identification of the session record corresponding to said WEB request, and
  after having determined that the user who sent said message is an illegal user, the method further comprises: searching the corresponding session record according to the feature identification of the session record carried by said redirecting message and deleting the same.

5. The method as claimed in claim 1, wherein said access router determines that the user who sent said another message is a legal user when the corresponding session record is found or when said access router receives via said first interface a message taking said detected IP address as the destination IP address.

6. A device for detecting an IP address, which device acts as an access router for application in an operator's network, wherein said device is connectable via a first interface to a network accessed by a user and is connectable via a second interface to an upstream access channel of the operator's network, said device comprises:
  a configuration unit to configure a detected IP address;
  a route releasing unit to release routes of said detected IP address via said first interface and said second interface, and to set that the priority of the route released via said first interface is lower than that of the route released via said second interface;
  a receiving unit to receive messages sent by the user via said first interface and second interface;
  a searching unit to search a session record corresponding to a WEB request when said receiving unit receives via said first interface said WEB request sent by the user;
  a record establishing unit to establish a session record corresponding to said user when said searching unit fails to find a matched session record;
  a redirecting unit to return a redirecting message which takes said detected IP address as a re-directed destination IP address when said searching unit fails to find the corresponding session record; and
  a detecting unit to detect whether a destination IP address of another message received by said receiving unit via said second interface is said detected IP address, and determining that the user who sent said another message is an illegal user when the detection result is yes.

7. The device as claimed in claim 6, wherein said configuration unit is to configure said detected IP address on a loopback interface.

8. The device as claimed in claim 6, wherein said route releasing unit is to increase the path length of an autonomous system path (AS-Path) or modifying the value of a multi-exit discriminator (MED) when the route is released via said first interface.

9. The device as claimed in claim 6, wherein said redirecting message further carries a feature identification of the session record corresponding to said WEB request, and the device further comprises:
  a deleting unit to search the corresponding session record according to the feature identification of the session record carried by said redirecting message when said detecting unit determines that the user who sent said another message is an illegal user, and to delete the same.

10. The device as claimed in claim 6, wherein said detecting unit is further to:
  determine that the user who sent said another message is a legal user when the corresponding session record is found by said searching unit or when said receiving unit receives via said first interface a message which takes said detected IP address as the destination IP address.

* * * * *